US011926068B1

(12) United States Patent
Marfione et al.

(10) Patent No.: US 11,926,068 B1
(45) Date of Patent: Mar. 12, 2024

(54) FOLDING KNIFE

(71) Applicants: Anthony Louis Marfione, Mills River, NC (US); John Crawford, Canton, NC (US)

(72) Inventors: Anthony Louis Marfione, Mills River, NC (US); John Crawford, Canton, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/449,035

(22) Filed: Aug. 14, 2023

(51) Int. Cl.
*B26B 1/04* (2006.01)
*B26B 1/10* (2006.01)

(52) U.S. Cl.
CPC .............. *B26B 1/048* (2013.01); *B26B 1/046* (2013.01); *B26B 1/10* (2013.01)

(58) Field of Classification Search
None
See application file for complete search history.

(56) References Cited

U.S. PATENT DOCUMENTS

| | | | | |
|---|---|---|---|---|
| 1,056,404 | A | | 3/1913 | Lorenzo |
| 1,231,058 | A | | 6/1917 | Pansa |
| 2,854,745 | A | | 10/1958 | Braverman |
| 3,783,509 | A | | 1/1974 | Lake |
| 4,089,112 | A | | 5/1978 | Richards |
| 4,523,379 | A | | 6/1985 | Osterhout |
| 4,744,146 | A | | 5/1988 | Schmidt |
| 4,750,267 | A | * | 6/1988 | Boyd ..................... B26B 1/046 30/161 |
| 4,947,552 | A | | 8/1990 | Barnes |
| 5,060,379 | A | | 10/1991 | Neely |
| 5,502,895 | A | | 4/1996 | Lemaire |
| 5,511,311 | A | | 4/1996 | Collins |
| 5,617,635 | A | | 4/1997 | Berns |
| 5,722,168 | A | | 3/1998 | Huang |
| 5,819,414 | A | | 10/1998 | Marifone |
| 6,085,423 | A | | 7/2000 | Marifone |
| 6,101,724 | A | | 8/2000 | Halligan |
| 6,148,522 | A | | 11/2000 | Dobandi |
| 6,154,965 | A | | 12/2000 | Sakai |
| 6,668,460 | B2 | | 12/2003 | Feng |

(Continued)

FOREIGN PATENT DOCUMENTS

| | | | |
|---|---|---|---|
| DE | 10 2006 054 422 B3 | * | 4/2008 |
| FR | 2 732 637 | * | 10/1996 |

*Primary Examiner* — Hwei-Siu C Payer
(74) *Attorney, Agent, or Firm* — Steve LeBlanc, LLC

(57) ABSTRACT

A folding knife includes first and second scales and a blade having a tang and a cutting edge. The tang pivotally connects the blade between the first and second scales. The blade has a retracted position with the cutting edge between the first and second scales and a deployed position with the cutting edge outside the first and second scales. An actuator between the first and second scales has a first position that locks the blade in the deployed position and a second position that allows movement of the blade between the deployed and retracted positions. A spring is in compression with the actuator between the first and second scales so that the spring biases the actuator toward the tang of the blade. A detent in the actuator engages with the tang when the actuator is in the first position and the blade is in the deployed position.

20 Claims, 8 Drawing Sheets

(56) References Cited

U.S. PATENT DOCUMENTS

| | | | | |
|---|---|---|---|---|
| 6,675,484 | B2 | 1/2004 | McHenry | |
| 7,086,158 | B1 | 8/2006 | Halpern | |
| 7,246,441 | B1 | 7/2007 | Collins | |
| 7,305,729 | B2 | 12/2007 | Dehner | |
| 7,305,769 | B2 | 12/2007 | McHenry | |
| RE41,259 | E | 4/2010 | McHenry et al. | |
| 7,797,838 | B2 | 9/2010 | Chu | |
| 7,979,990 | B2 | 7/2011 | Hawk et al. | |
| 8,028,419 | B2 | 10/2011 | VanHoy | |
| 8,671,578 | B1 | 3/2014 | Frazer | |
| 8,935,855 | B2 | 1/2015 | Qui | |
| 9,573,282 | B1 | 2/2017 | Sheahan | |
| 9,737,997 | B1 | 8/2017 | Marfione et al. | |
| 10,071,489 | B2 | 9/2018 | MacNair | |
| 10,189,170 | B2 | 1/2019 | Marfione et al. | |
| 10,737,401 | B1 | 8/2020 | Coves et al. | |
| 10,751,890 | B1 | 8/2020 | Marione | |
| 11,607,818 | B1 * | 3/2023 | Crawford | B26B 1/08 |
| 11,633,867 | B1 | 4/2023 | Crawford et al. | |
| 11,639,006 | B1 | 5/2023 | Chumchal | |
| 2003/0070299 | A1 | 4/2003 | Frazer | |
| 2003/0213134 | A1 * | 11/2003 | Sakai | B26B 1/048 30/161 |
| 2004/0045170 | A1 | 3/2004 | Glesser | |
| 2005/0044717 | A1 | 3/2005 | Nishihara | |
| 2005/0252010 | A1 | 11/2005 | Freeman | |
| 2006/0143929 | A1 | 7/2006 | Lake | |
| 2007/0204468 | A1 | 9/2007 | Cheng | |
| 2009/0277015 | A1 * | 11/2009 | Duey | B26B 1/046 30/158 |
| 2012/0180320 | A1 | 7/2012 | Lo | |
| 2012/0304470 | A1 | 12/2012 | Freeman | |
| 2013/0133205 | A1 * | 5/2013 | Lo | B26B 1/048 30/160 |
| 2013/0283621 | A1 * | 10/2013 | Snyder | B25G 1/08 81/489 |
| 2015/0367520 | A1 | 12/2015 | MacNair | |
| 2018/0169875 | A1 | 6/2018 | Valdez | |
| 2019/0061181 | A1 | 2/2019 | France | |
| 2020/0001476 | A1 | 1/2020 | Allen et al. | |

* cited by examiner

FOLDING KNIFE

FIELD OF THE INVENTION

The present invention generally involves a folding knife. In particular embodiments, the folding knife may be manually operated, single action, or double action.

BACKGROUND OF THE INVENTION

Pocket knives provide a convenient tool for cutting that may be easily carried by a user. A folding knife is a particular style of pocket knife that has a blade pivotally connected to a handle. The handle generally includes a pair of scales that sandwich the blade between them, and the blade pivots with respect to the scales to transition between retracted and deployed positions. When retracted, a cutting edge of the blade resides between the scales, and the scales protect the cutting edge from inadvertent contact that might damage the cutting edge or cause personal injury. When deployed, the blade extends from the scales to expose the cutting edge for use.

A manually operated folding knife requires a user to physically rotate the blade with respect to the handle to reposition the blade between the retracted and deployed positions. A single action folding knife includes a spring that engages with the blade to automatically deploy the blade, and the user must apply force to the blade to overcome the spring force to manually pivot the blade with respect to the handle to return the blade to the retracted position. A double action folding knife includes a spring that engages with the blade to automatically deploy and retract the blade.

Folding knife designs often balance competing goals of aesthetics and safety with ease of operation, maintenance, and repair. The appearance of the blade and handle generally provides the aesthetic characteristics of a folding knife. An actuator and/or lock incorporated into the handle enhances safety by preventing inadvertent movement of the blade between the deployed and retracted positions. However, friction associated with repeated operation of the folding knife may result in wear that adversely affects the safe and reliable operation of the folding knife. For example, as the blade is repeatedly retracted and deployed, friction between the actuator and/or lock and the blade erodes the surfaces between the components and introduces play between the components that can adversely affect the smooth operation of the folding knife or the ability of the actuator and/or lock to prevent inadvertent movement of the blade between the deployed and retracted positions. Therefore, the need exists for an improved folding knife design that can securely hold the blade in the retracted and deployed positions without complicating the assembly, maintenance, and repair of the folding knife.

BRIEF DESCRIPTION OF THE INVENTION

Aspects and advantages of the invention are set forth below in the following description, or may be obvious from the description, or may be learned through practice of the invention.

One embodiment of the present invention is a folding knife that includes a first scale, a second scale opposed to the first scale, and a blade having a tang and a cutting edge. The tang of the blade pivotally connects the blade between the first and second scales. The blade has a retracted position in which the cutting edge is between the first and second scales, and the blade has a deployed position in which the cutting edge is outside the first and second scales. An actuator is at least partially between the first and second scales, and the actuator has a first position that locks the blade in the deployed position and a second position that allows movement of the blade between the deployed and retracted positions. A spring is in compression with the actuator between the first and second scales so that the spring biases the actuator toward the tang of the blade. A detent in the actuator engages with the tang of the blade when the actuator is in the first position and the blade is in the deployed position.

An alternate embodiment of the present invention is a folding knife that includes a handle and a blade having a tang and a cutting edge. The tang of the blade pivotally connects the blade to the handle. The blade has a retracted position in which the cutting edge is inside the handle, and the blade has a deployed position in which the cutting edge is outside the handle. An actuator is in sliding engagement with the handle. The actuator has a first position that locks the blade in the deployed position and a second position that allows movement of the blade between the deployed and retracted positions. A spring is in compression with the actuator inside the handle so that the spring biases the actuator toward the tang of the blade. A detent in the actuator engages with the tang of the blade when the actuator is in the first position and the blade is in the deployed position.

In yet another embodiment of the present invention, a folding knife includes a handle and a blade having a tang and a cutting edge. The tang of the blade pivotally connects the blade to the handle. The blade has a retracted position in which the cutting edge is inside the handle, and the blade has a deployed position in which the cutting edge is outside the handle. An actuator is in sliding engagement with the handle, and the actuator has a first position that locks the blade in the deployed position and a second position that allows movement of the blade between the deployed and retracted positions. A detent is in the actuator, and a first notch is in the tang of the blade. The detent in the actuator engages with the first notch in the tang of the blade when the actuator is in the first position and the blade is in the deployed position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
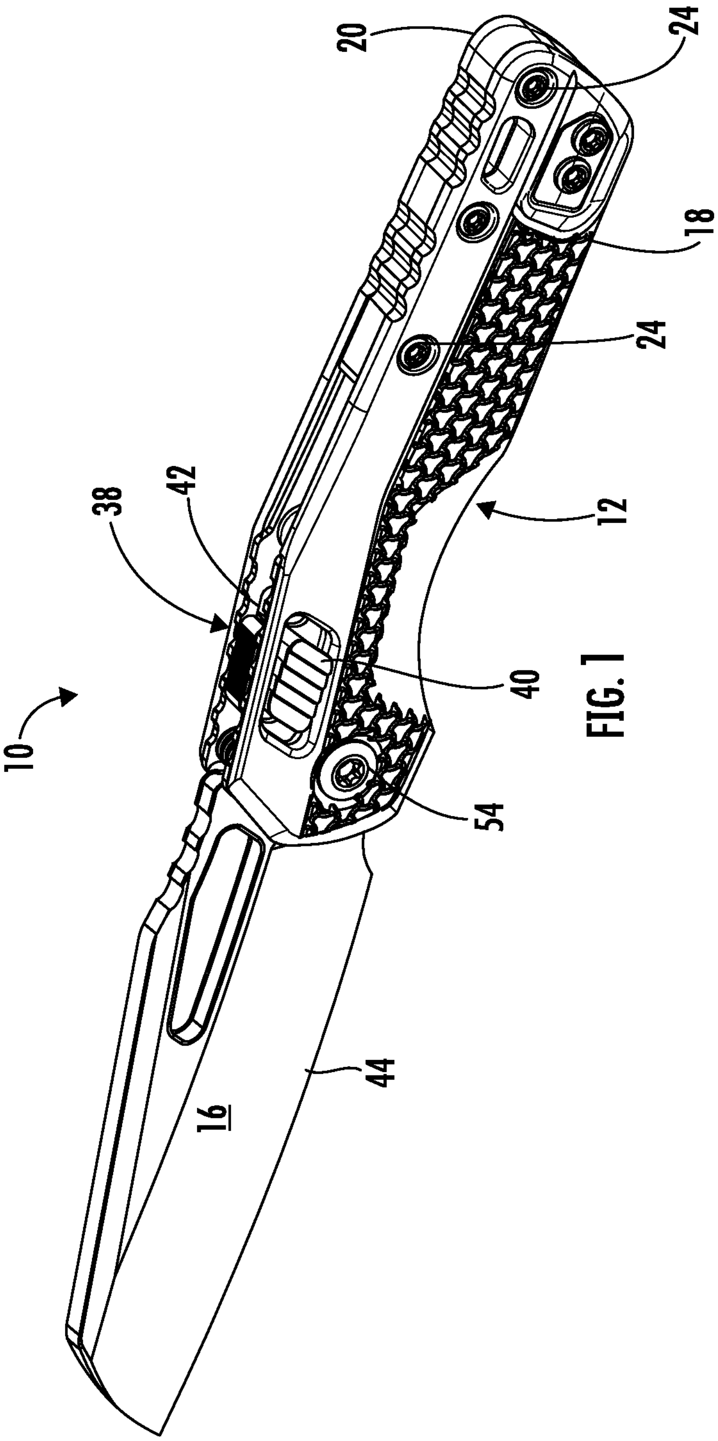
FIG. 1 is a perspective view of a folding knife according to one embodiment of the present invention in a deployed position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is a folding knife with a blade that folds into a handle of the folding knife. Embodiments of the present invention include an actuator that allows the blade to be retracted and deployed while also reducing the impact of wear or erosion between contact surfaces associated with repetitive operation of the folding knife. Although various embodiments are illustrated as a manual folding knife, one of ordinary skill in the art will readily appreciate that embodiments of the present invention may include a single or double action folding knife, and the present invention is not limited to a particular configuration or action unless specifically recited in the claims.

Figure 2:
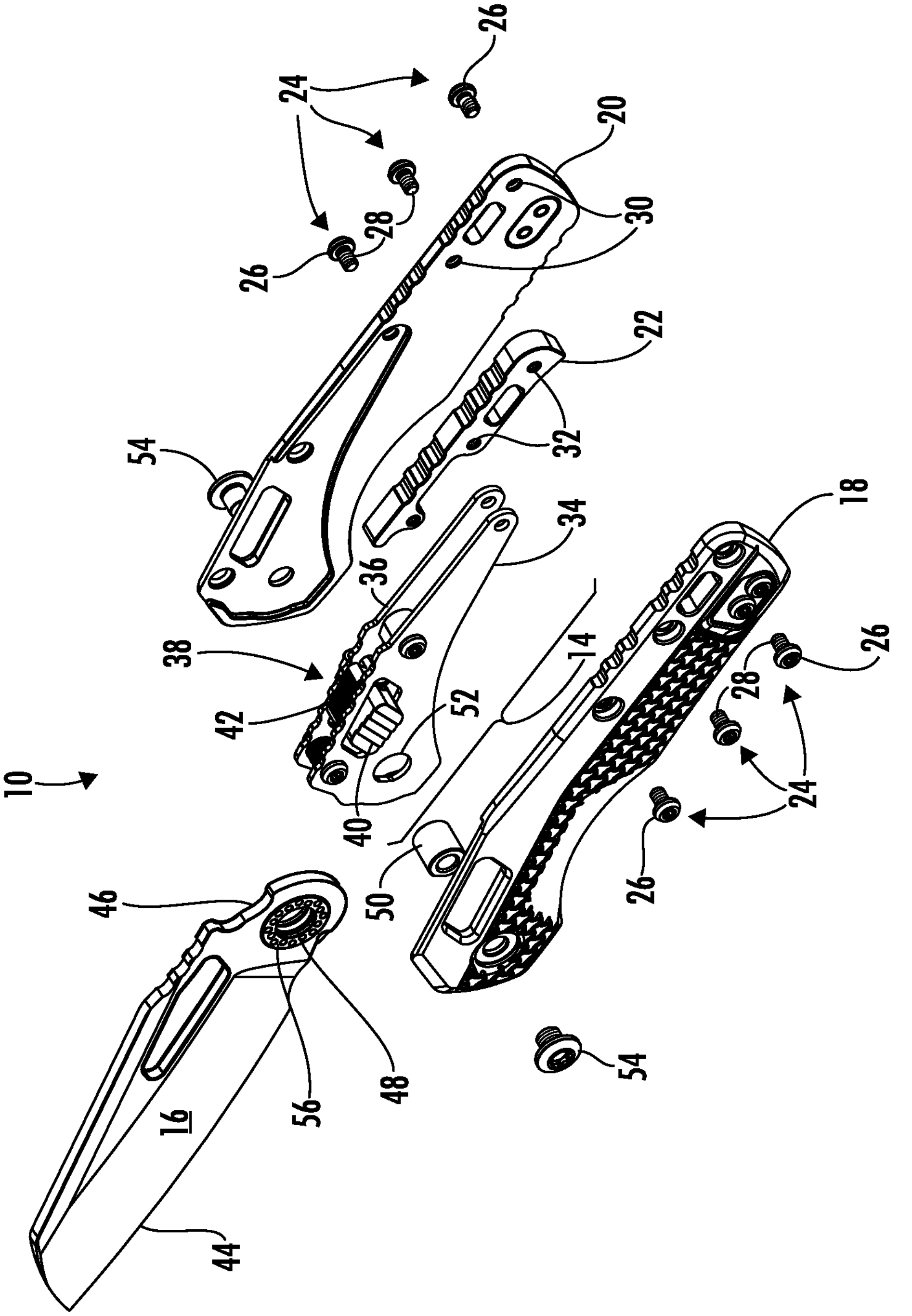
FIG. 2 is an exploded perspective view of the folding knife shown in FIG. 1.

FIG. 1 provides a perspective view of a folding knife 10 according to one embodiment of the present invention in a deployed position, and FIG. 2 provides an exploded perspective view of the folding knife 10 shown in FIG. 1. As shown in FIGS. 1 and 2, the folding knife 10 may generally include a handle 12, a modular lock 14 (shown more clearly in FIGS. 2-4), and a blade 16.

The handle 12 houses and supports the modular lock 14 and the blade 16 and provides the primary structure for holding the folding knife 10 during use. The handle 12 may be constructed from metal, fiberglass, carbon, polymers, or other composite materials known in the art, and the outside of the handle 12 may include various textured surfaces to facilitate handling and gripping the folding knife 10. The handle 12 may be a single-piece construction, but more commonly includes a first or left scale 18 and a second or right scale 20 opposed to the left scale 18. As shown in FIG. 2, the folding knife 10 may further include a spacer 22 between the first and second scales 18, 20 to provide support and structure for the first and second scales 18, 20. In the particular embodiment shown in FIG. 2, the optional spacer 22 fits into the modular lock 14; however, the present invention is not limited to any particular location for the optional spacer 22 unless specifically recited in the claims.

The left and right scales 18, 20 connect together on opposing sides of the modular lock 14 and the blade 16 using a means for releasably connecting the left scale 18 to the right scale 20. The function of the means is to releasably connect the left scale 18 to the right scale 20. The structure for performing this function may be one or more screws 24 or equivalent structure for releasably connecting one component to another. Each screw 24 may have a head end 26 and a threaded end 28. The head end 26 of each screw 24 may engage with one of the left or right scales 18, 20, and each screw 24 may extend through the spacer 22 (if present) to the opposite scale 20, 18 so that the threaded end 28 of each screw 24 threadingly engages with holes 30 in the opposite scale 20, 18. Alternately, as shown in FIG. 2, the structure for releasably connecting the left scale 18 to the right scale 20 may further include the spacer 22, and the threaded end 28 of each screw 24 may threadingly engage with holes 32 in the spacer 22. In this manner, the screws 24 releasably connect the left scale 18 to the right scale 20 by releasably connecting each scale 18, 20 to the spacer 22 between the scales 18, 20.

As shown in FIG. 2, the modular lock 14 includes a first or left liner 34, a second or right liner 36, and an actuator 38. The left and right liners 34, 36 are opposed to one another inside the handle 12 or between the left and right scales 18, 20 to house and support the actuator 38 and other components of the modular lock 14 as will be described with respect to FIGS. 3 and 4. The actuator 38 is at least partially between the left and right liners 34, 36 with first or vertical surfaces 40 and a second or horizontal surface 42 that is orthogonal to the vertical surfaces 40. One or both of the vertical surfaces 40 extend through the left and/or right liners 34, 36 and the left and/or right scales 18, 20. The horizontal surface 42 extends above the left and right liners 34, 36 and above the handle 12. In this manner, the vertical and horizontal surfaces 40, 42 of the actuator 38 are readily accessible for operation by the user.

The blade 16 is typically made of hardened or heat-treated steel, titanium, or other suitable material and generally includes a cutting edge 44 along one or both sides and a tang 46 at one end. In particular embodiments, the cutting edge 44 may be curved, straight, and/or serrated. The tang 46 generally refers to the unsharpened, unexposed portion of the blade 16 sandwiched between the left and right scales 18, 20. The tang 46 pivotally connects the blade 16 between the left and right liners 34, 36. As shown in FIG. 2, for example, the tang 46 may include a through bore 48, and a cylindrical retainer 50 may slide through holes 52 in the left and right liners 34, 36 and the through bore 48 to pivotally connect the blade 16 between the left and right liners 34, 36 and left and right scales 18, 20. The inner surface of the left and right scales 18, 20 may hold the retainer 50 in place. Alternately, a pair of screws 54 engaged with the outer surfaces of the left and right scales 18, 20 may be threaded into opposite sides of the retainer 50 to more securely hold the retainer 50 in place. A bearing 56 may be included in the through bore 48 of the tang 46 to reduce the friction between the tang 46 and the retainer 50 as the blade 16 pivots between the left and right liners 34, 36. In this manner, the blade 16 has a deployed position (shown in FIGS. 1, 2, 11 and 12) in which the cutting edge 44 is outside the handle 12 or left and right scales 18, 20 and a retracted position (shown in FIGS. 8 and 9) in which the cutting edge 44 is inside the handle 12 or between the left and right scales 18, 20.

Figure 3:
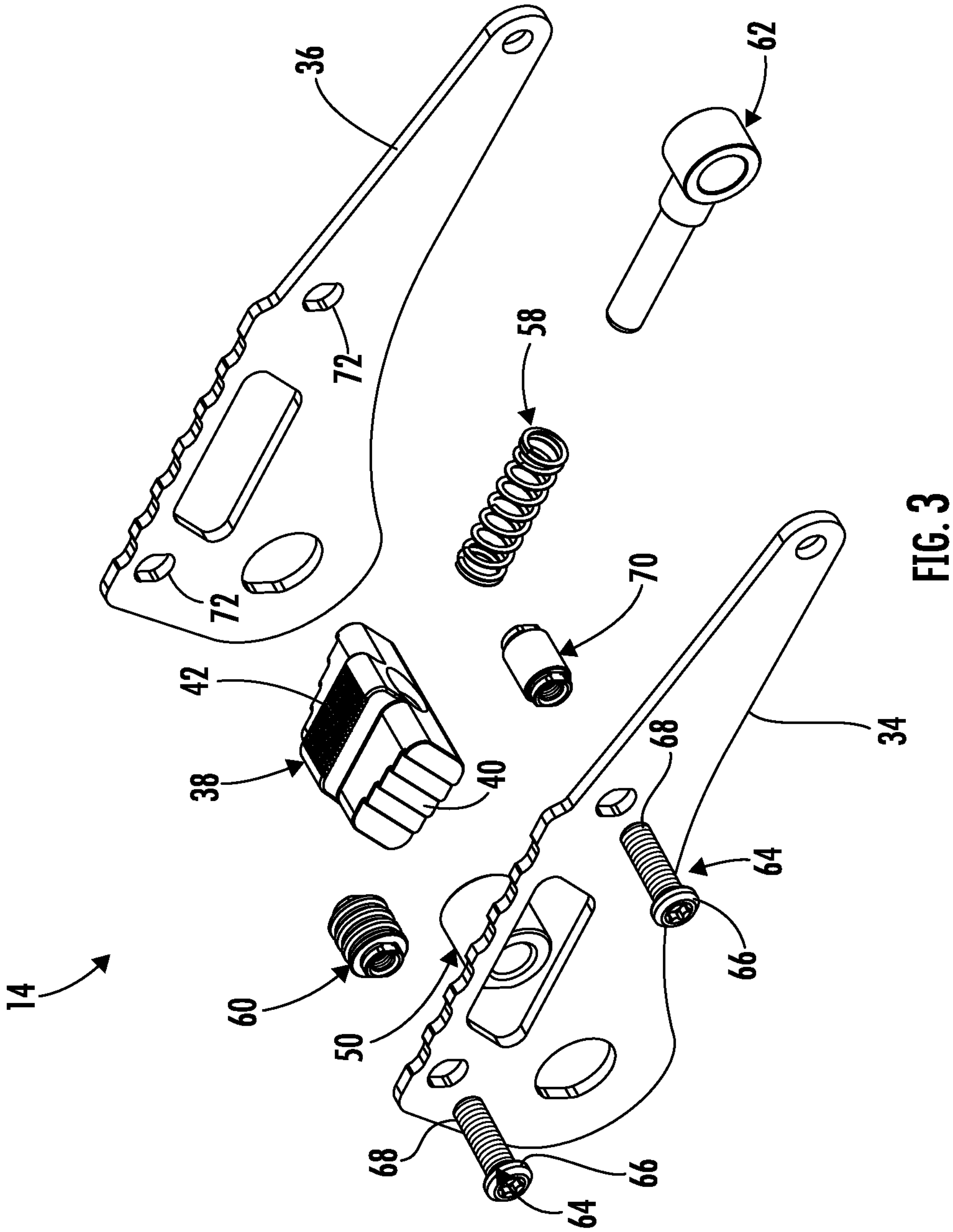
FIG. 3 is an exploded perspective view of a modular lock according to an embodiment of the present invention.

FIG. 3 provides an exploded perspective view of the modular lock 14 according to an embodiment of the present invention. As previously described with respect to FIG. 2, the left and right liners 34, 36 are opposed to one another inside the handle 12 or between the left and right scales 18, 20 to house and support the actuator 38 and other components of the modular lock 14. The actuator 38 is at least partially between the left and right liners 34, 36 with first or vertical surfaces 40 that extend through the left and/or right liners 34, 36 and the left and/or right scales 18, 20. The second or horizontal surface 42 is orthogonal to the vertical surfaces 40 and extends above the left and right liners 34, 36 and the handle 12.

As shown in FIG. 3, the modular lock 14 may further include a spring 58 and a stop pin 60 between the left and right liners 34, 36. A dowel 62 may be inserted longitudinally through the spring 58 to stabilize the spring 58 in compression against the actuator 38 so that the spring 58 biases the actuator 38 toward the tang 46 of the blade 16. As will be described with respect to FIGS. 8-12, the actuator 38 has a first position that locks the blade 16 in the deployed position and a second position that allows movement of the blade 16 between the deployed and retracted positions. As will also be described with respect to FIGS. 8-12, the stop pin 60 may be engaged with the blade 16 when the blade 16 is in the deployed position.

The modular lock 14 further includes a means for releasably connecting the left liner 34 to the right liner 36 independently from the left and right scales 18, 20. The function of the means is to releasably connect the left liner 34 to the right liner 36 independently from the left and right scales 18, 20. As used herein, the phrase "independently from the left and right scales 18, 20" requires that the means releasably connects the left liner 34 to the right liner 36 regardless of the presence or absence of the left and right scales 18, 20, and the removal or disassembly of the left and right scales 18, 20, without any further action, does not release the connection between the left and right liners 34, 36. The structure for performing this function may be one or more screws 64 or equivalent structure for releasably connecting one component to another. In the embodiment shown in FIG. 3, for example, the structure for performing this function includes two screws 64, and each screw may have a head end 66 and a threaded end 68. The head end 66 of each screw 64 may engage with one liner 34. One screw 64 may extend through the stop pin 60 to the opposite liner 36, while the other screw 64 may extend through a spacer 70 in the dowel 62 to the opposite liner 36. The threaded end 68 of each screw 64 may then threadingly engage with holes 72 in the opposite liner 36 to releasably connect the left liner 34 to the right liner 36 independently from the left and right scales 18, 20.

Figure 4:
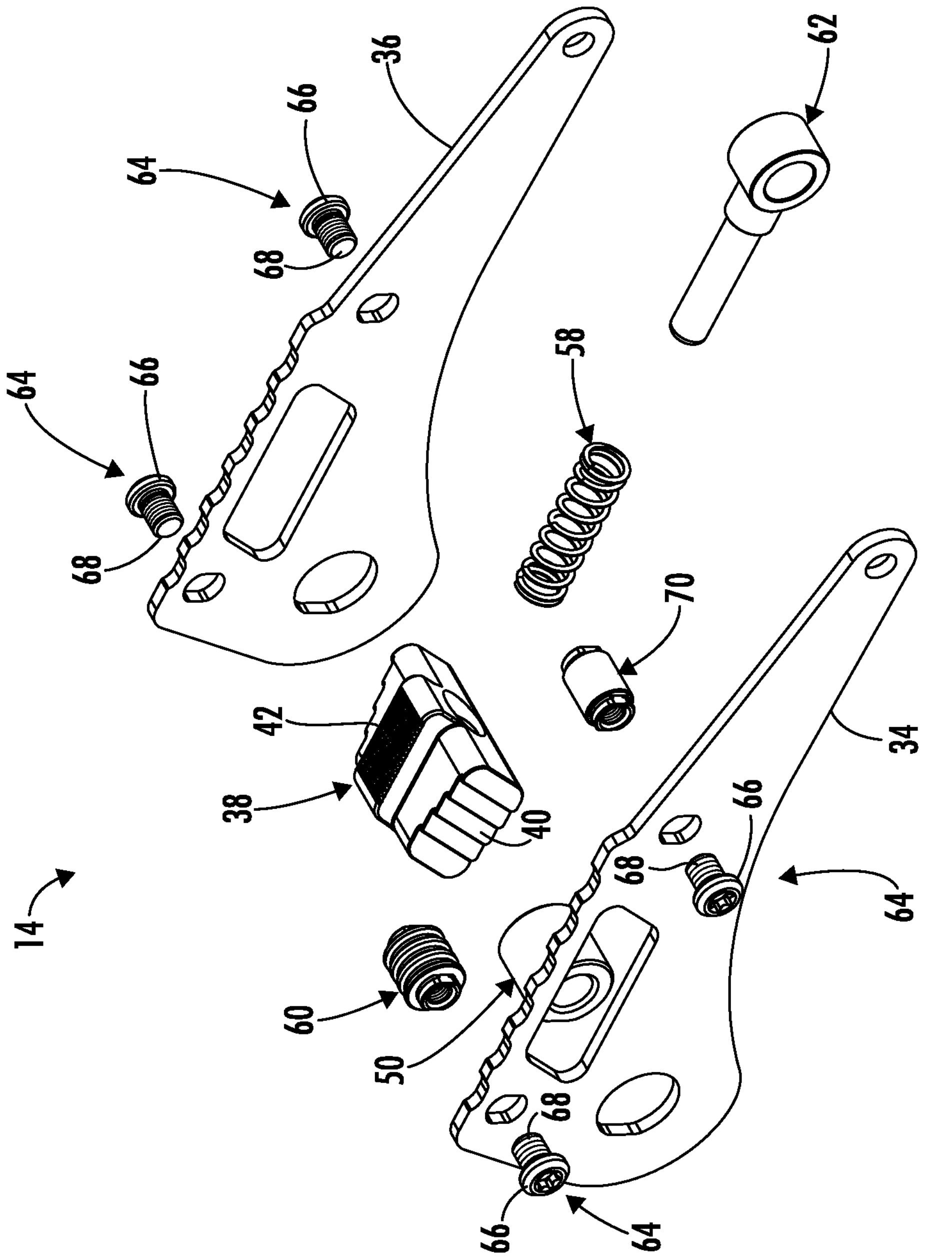
FIG. 4 is an exploded perspective view of the modular lock according to an alternate embodiment of the present invention.

FIG. 4 provides an exploded perspective view of the modular lock 14 according to an alternate embodiment of the present invention. As shown in FIG. 4, the structure for releasably connecting the left liner 34 to the right liner 36 independently from the left and right scales 18, 20 may include four screws 64, the stop pin 60, and the spacer 70. In this embodiment of the modular lock 14, two screws 64 are on each side of the modular lock 14 so that the head end 66 of each screw 64 may again engage with one liner 34, 36. The threaded ends 68 of two screws 64 may threadingly engage with opposite sides of the stop pin 60, while the threaded ends 68 of the other two screws 64 may threadingly engage with opposite sides of the spacer 70. In this manner, the four screws 64, stop pin 60, and spacer 70 releasably connect the left liner 34 to the right liner 36 independently from the left and right scales 18, 20 by releasably connecting each liner 34, 36 to the stop pin 60 and spacer 70 between the liners 34, 36.

Figure 5:
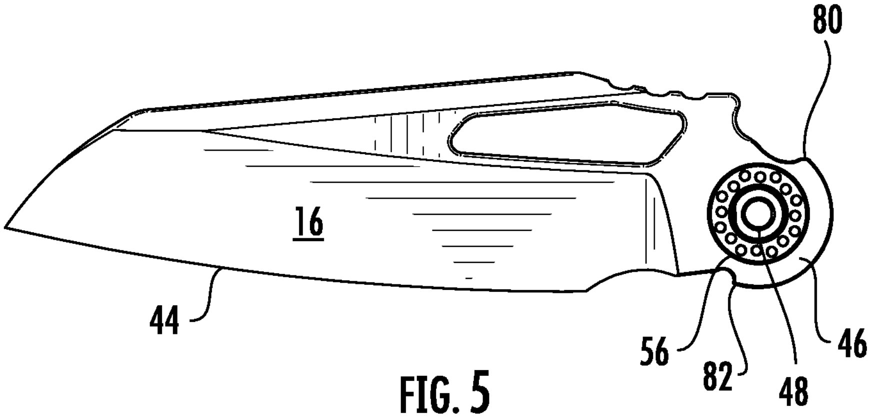
FIG. 5 is a left side plan view of the blade shown in FIGS. 1 and 2.

FIG. 5 provides a left side plan view of the blade 16 shown in FIGS. 1 and 2. As shown in FIG. 5, the tang 46 of the blade 16 may include first and second notches 80, 82 on generally opposing sides of the tang 46. As will be described in more detail with respect to FIGS. 8-12, the first notch 80 in the tang 46 of the blade 16 engages with the actuator 38 when the actuator 38 is in the first position and the blade 16 is in the deployed position, and the second notch 82 in the tang 46 of the blade 16 engages with the actuator 38 when the actuator 38 is in the second position and the blade 16 is in the retracted position.

Figure 6:
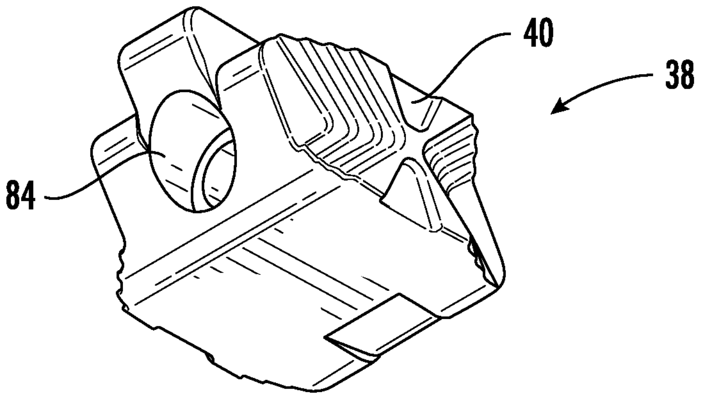
FIG. 6 is a right rear perspective view of the actuator shown in FIGS. 3 and 4.
Figure 7:
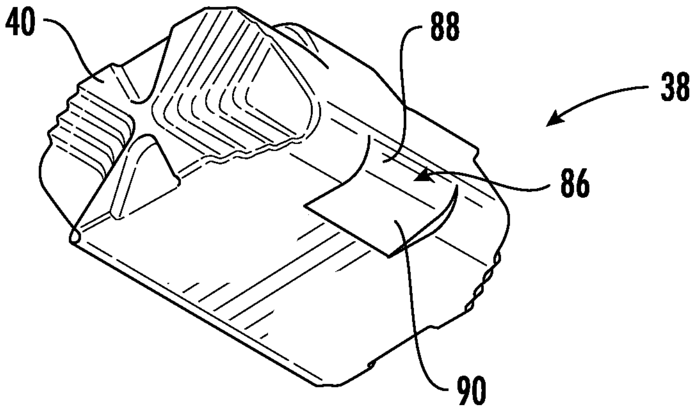
FIG. 7 is a right front perspective view of the actuator shown in FIGS. 3 and 4.

FIGS. 6 and 7 provide right rear and right front perspective views, respectively, of the actuator 38 shown in FIGS. 3 and 4. As shown in FIG. 6, the actuator 38 may include a recess 84 that receives the spring 58 and/or the dowel 62. The recess 84 enhances the stability of the actuator 38 as it slides with respect to the handle 12 and moves between the first and second positions. As shown in FIG. 7, the actuator 38 may also include a recessed detent 86 that engages with the tang 46 of the blade 16 when the actuator 38 is in the first position and the blade 16 is in the deployed position. Specifically, the first notch 80 in the tang 46 of the blade 16 fits in the recessed detent 86 to more securely engage the actuator 38 with the tang 46 of the blade 16 when the actuator 38 is in the first position and the blade 16 is in the deployed position. As shown in FIG. 7, the recessed detent 86 may include a curved section 88 and a flat section 90. As the spring 58 biases the actuator 38 toward the tang 46 of the blade, the curved section 88 of the recessed detent 86 allows the first notch 80 in the tang 46 of the blade 16 to smoothly slide into the recessed detent 86 as the blade 16 transitions to the deployed position. The flat section 90 of the recessed detent 38 then locks the blade 16 in the deployed position against the stop pin 60. As the flat section 90 of the detent 86 and/or the first notch 80 in the tang 46 of the blade 16 erode due to repeated operation of the folding knife 10, the spring 58 biases the actuator 38 further toward the tang 46 of the blade 16 to maintain a secure engagement between the recessed detent 86 and the first notch 80, thereby maintaining the blade 16 in the locked, deployed position.

Figure 8:
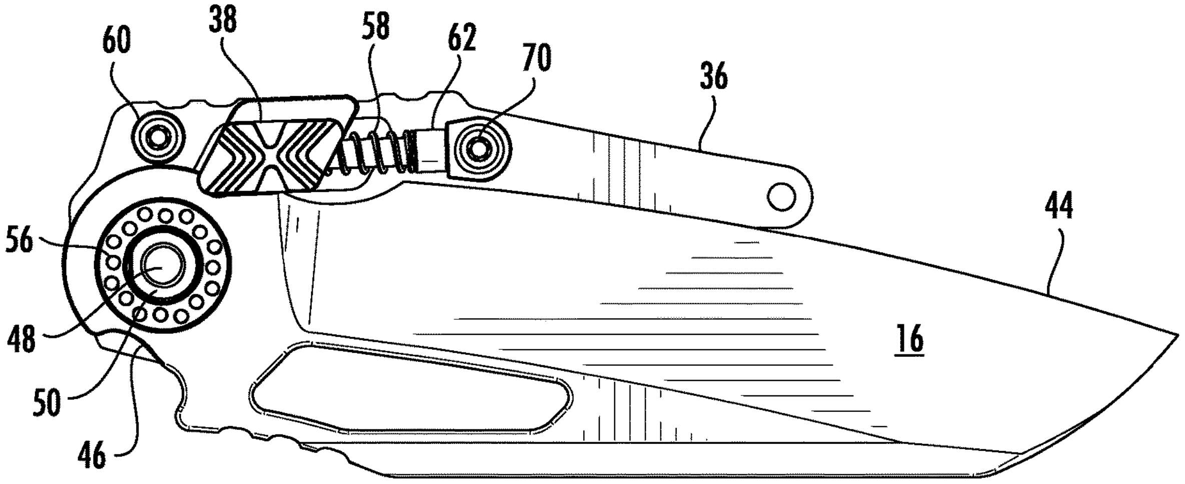
FIG. 8 is a left side plan view of the modular lock and blade with the left liner removed and the blade locked in a retracted position.

Operation of the folding knife 10 will now be described with respect to FIGS. 8-12. Each figure provides a side plan view of the modular lock 14 and blade 16 with the left liner 34 removed and the blade 16 and actuator 38 in various positions. Starting with FIG. 8, the blade 16 is in the retracted position with the cutting edge 44 inside the handle 12 or between the left and right scales 18, 20, and the actuator 38 is in the second position that allows movement of the blade 16 between the retracted and deployed positions. The dowel 62 holds the spring 58 in compression against the actuator 38 so that the actuator 38 engages with the second notch 82 in the tang 46 of the blade 16. As a result, the actuator 38 prevents the blade 16 from freely rotating clockwise, thereby holding the blade 16 in the retracted position, but allowing a user to reposition the blade 16 between the retracted and deployed positions without repositioning the actuator 38. Specifically, a user may manually reposition the blade 16 from the retracted position by simply holding the handle 12 in one hand while pulling on the blade 16 with the other hand. As the user pulls on the blade 16, the second notch 82 in the tang 46 of the blade 16 overcomes the bias of the spring 58 against the actuator 38 to force the actuator 38 to the right as shown in FIG. 8 and allow the curved portion of the tang 46 to slide over the actuator 38 as the blade 16 leaves the retracted position.

Figure 9:
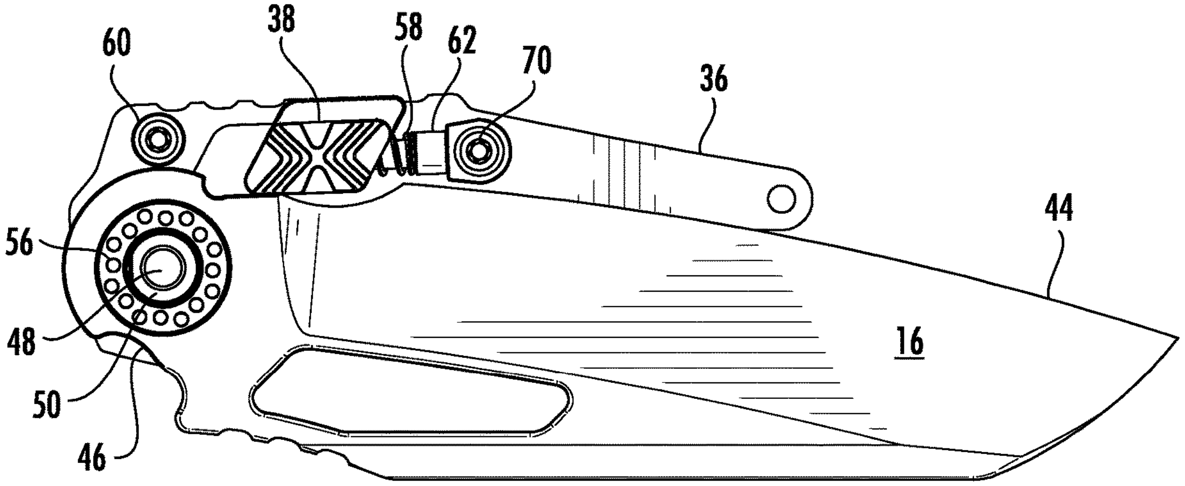
FIG. 9 is a left side plan view of the modular lock and blade with the left liner removed and the blade unlocked in the retracted position.

Alternately, as shown in FIG. 9, a user may manually move the actuator 38 to the right against the compression of the spring 58 to allow the blade 16 to freely rotate clockwise. With the actuator 38 held against the spring 58 bias, the user may freely rotate the blade 16 clockwise from the retracted position.

Figure 10:
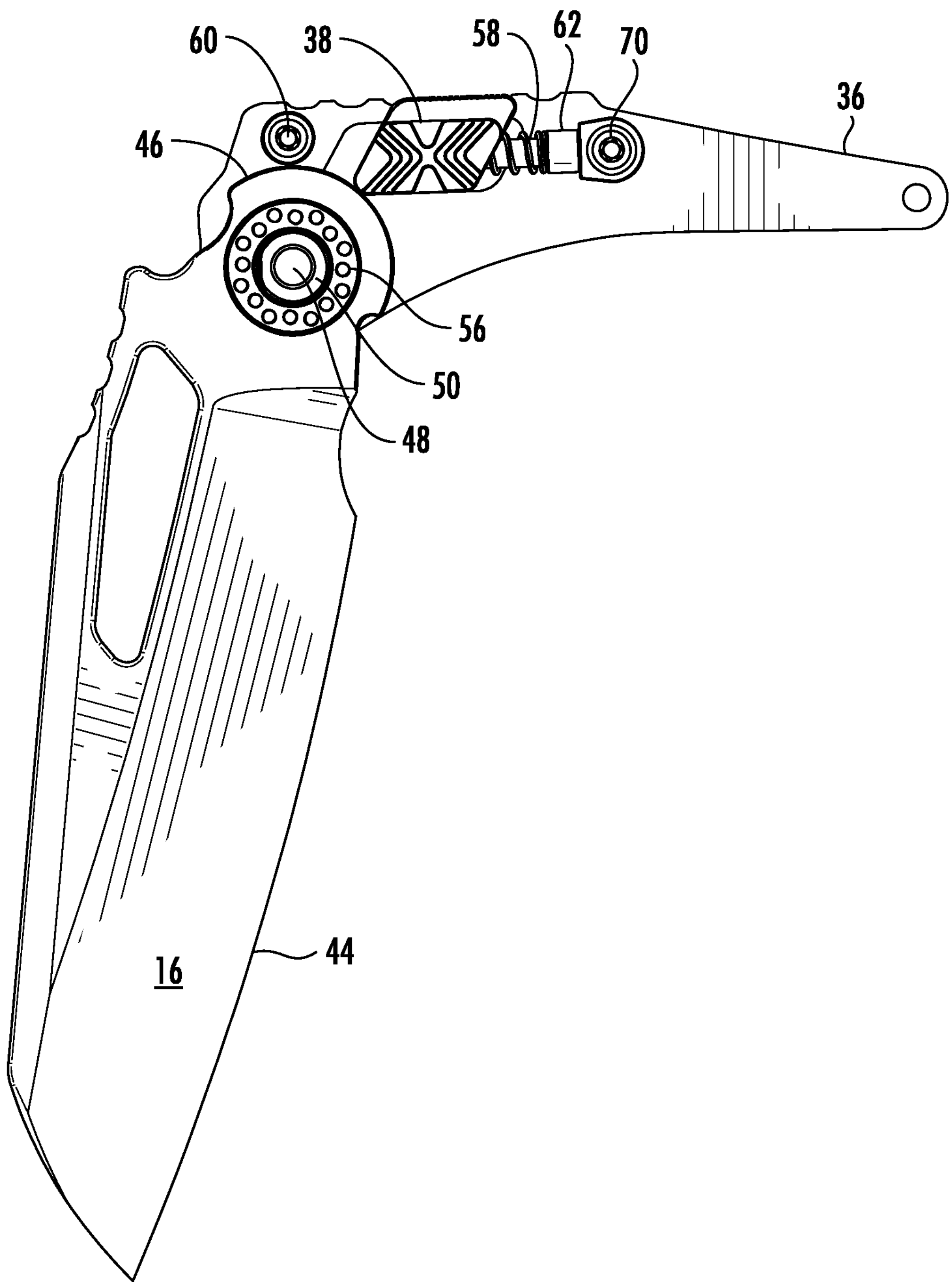
FIG. 10 is a left side plan view of the modular lock and blade with the left liner removed and the blade unlocked in an intermediate position.

In FIG. 10, the user has manually rotated the blade 16 clockwise from the retracted position. As shown in FIG. 10, the tang 46 of the blade 16 slides against the actuator 38 to prevent the actuator 38 from moving further left. As the blade 16 continues to rotate clockwise, the first notch 80 in the tang 46 of the blade 16 slides into the detent 86 in the actuator 38, and the spring 58 moves the actuator 38 to the left to lock the blade 16 in the deployed position.

Figure 11:
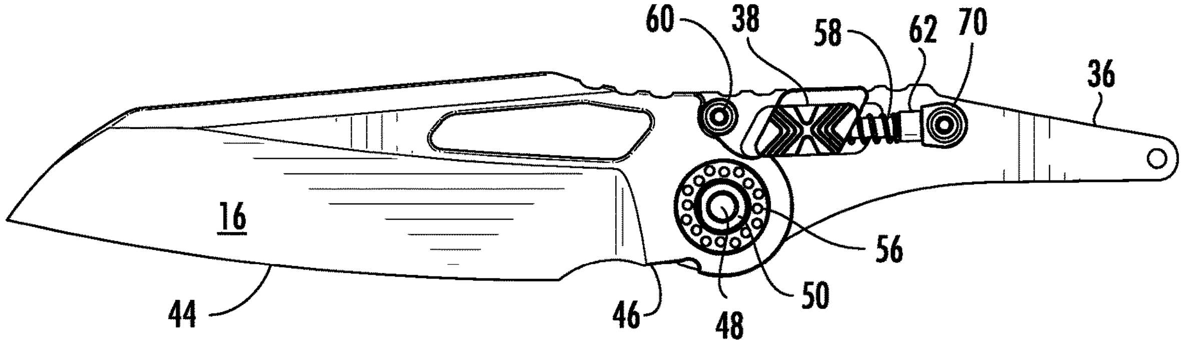
FIG. 11 is a left side plan view of the modular lock and blade with the left liner removed and the blade locked in the deployed position.

In FIG. 11, the blade 16 has reached the deployed position with the cutting edge 44 of the blade 16 outside of the handle 12 and the stop pin 60 engaged with the blade 16 to prevent the blade 16 from further clockwise rotation. The actuator 38 is in the first position with the detent 86 in the actuator 38 engaged with the first notch 80 in the tang 46 of the blade 16 to prevent the blade 16 from rotating counterclockwise, thereby locking the blade 16 in the deployed position.

Figure 12:
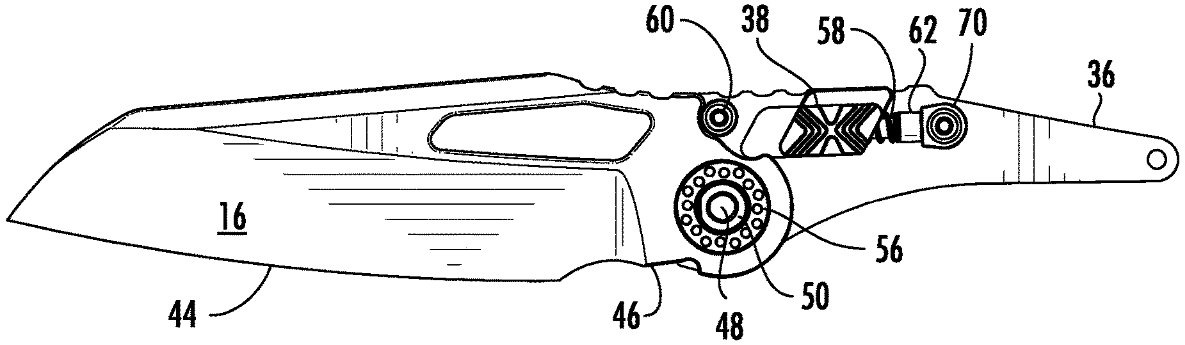
FIG. 12 is a left side plan view of the modular lock and blade with the left liner removed and the blade unlocked in the deployed position.

In FIG. 12, the actuator 38 has been manually moved to the right against the compression of the spring 58 and held in the second position which allows movement of the blade 16 between the deployed and retracted positions. In the second position, the actuator 38 is no longer engaged with the tang 46, and the user may manually rotate the blade 16 counterclockwise from the deployed position.

The actuator 38 in the first position thus locks the blade 16 in the deployed position, as shown in FIG. 11, while the actuator 38 in the second position allows movement of the blade 16 between the retracted and deployed positions, as shown in FIGS. 8-10 and 12. The detent 86 in the actuator 38 provides for a more secure engagement between the actuator 38 and the tang 46 of the blade 16 when the actuator 38 is in the first position and the blade 16 is in the deployed position. In addition, as the contact surfaces between the detent 86 and/or the tang 46 of the blade 16 erode due to repeated operation of the folding knife 10, the spring 58 biases the actuator 38 further toward the tang 46 of the blade 16 to maintain the secure engagement between the detent 86 and the first notch 80, thereby maintaining the blade 16 in the locked, deployed position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A folding knife, comprising:

a first scale;

a second scale opposed to the first scale;

a blade having a tang and a cutting edge, wherein the tang of the blade pivotally connects the blade between the first and second scales, the blade has a retracted position in which the cutting edge is between the first and second scales, and the blade has a deployed position in which the cutting edge is outside the first and second scales;

an actuator at least partially between the first and second scales, wherein the actuator has a first position that locks the blade in the deployed position and a second position that allows movement of the blade between the deployed and retracted positions;

a spring in compression with the actuator between the first and second scales so that the spring biases the actuator toward the tang of the blade; and a recessed detent in the actuator that engages with the tang of the blade when the actuator is in the first position and the blade is in the deployed position.

2. The folding knife as in claim 1, further comprising a notch in the tang of the blade, and the recessed detent in the actuator engages with the notch in the tang of the blade when the actuator is in the first position and the blade is in the deployed position.

3. The folding knife as in claim 1, further comprising a notch in the tang of the blade, and the actuator engages with the notch in the tang of the blade when the actuator is in the second position and the blade is in the retracted position.

4. The folding knife as in claim 1, wherein the actuator has a first surface that extends through the first scale and a second surface orthogonal to the first surface and extending above the first and second scales.

5. The folding knife as in claim 1, further comprising a recess in the actuator that receives the spring in compression.

6. The folding knife as in claim 1, further comprising a dowel inserted longitudinally through the spring between the first and second scales.

7. The folding knife as in claim 1, further comprising a stop pin between the first and second scales and engaged with the blade when the blade is in the deployed position.

8. A folding knife, comprising:

a handle;

a blade having a tang and a cutting edge, wherein the tang of the blade pivotally connects the blade to the handle, the blade has a retracted position in which the cutting edge is inside the handle, and the blade has a deployed position in which the cutting edge is outside the handle;

an actuator in sliding engagement with the handle, wherein the actuator has a first position that locks the blade in the deployed position and a second position that allows movement of the blade between the deployed and retracted positions;

a spring in compression with the actuator inside the handle so that the spring biases the actuator toward the tang of the blade; and a recessed detent in the actuator that engages with the tang of the blade when the actuator is in the first position and the blade is in the deployed position.

9. The folding knife as in claim 8, further comprising a notch in the tang of the blade, and the recessed detent in the actuator engages with the notch in the tang of the blade when the actuator is in the first position and the blade is in the deployed position.

10. The folding knife as in claim 8, further comprising a notch in the tang of the blade, and the actuator engages with the notch in the tang of the blade when the actuator is in the second position and the blade is in the retracted position.

11. The folding knife as in claim 8, wherein the actuator has a first surface that extends through the handle and a second surface orthogonal to the first surface and extending above the handle.

12. The folding knife as in claim 8, further comprising a recess in the actuator that receives the spring in compression.

13. The folding knife as in claim 8, further comprising a dowel inserted longitudinally through the spring inside the handle.

14. The folding knife as in claim 8, further comprising a stop pin inside the handle and engaged with the blade when the blade is in the deployed position.

15. A folding knife, comprising:

a handle;

a blade having a tang and a cutting edge, wherein the tang of the blade pivotally connects the blade to the handle, the blade has a retracted position in which the cutting edge is inside the handle, and the blade has a deployed position in which the cutting edge is outside the handle;

an actuator in sliding engagement with the handle, wherein the actuator has a first position that locks the blade in the deployed position and a second position that allows movement of the blade between the deployed and retracted positions;

a recessed detent in the actuator;

a first notch in the tang of the blade, and the recessed detent in the actuator engages with the first notch in the tang of the blade when the actuator is in the first position and the blade is in the deployed position.

16. The folding knife as in claim 15, further comprising a second notch in the tang of the blade, and the actuator engages with the second notch in the tang of the blade when the actuator is in the second position and the blade is in the retracted position.

17. The folding knife as in claim 15, wherein the actuator has a first surface that extends through the handle and a second surface orthogonal to the first surface and extending above the handle.

18. The folding knife as in claim 15, further comprising a spring in compression with the actuator inside the handle so that the spring biases the actuator toward the tang of the blade and a recess in the actuator that receives the spring in compression.

19. The folding knife as in claim 18, further comprising a dowel inserted longitudinally through the spring inside the handle.

20. The folding knife as in claim 15, further comprising a stop pin inside the handle and engaged with the blade when the blade is in the deployed position.

* * * * *